Jan. 8, 1957   R. W. J. COCKRAM   2,776,829
DEVICES RESPONSIVE TO RATES OF CHANGE OF ACCELERATION
Filed March 19, 1953   3 Sheets-Sheet 1
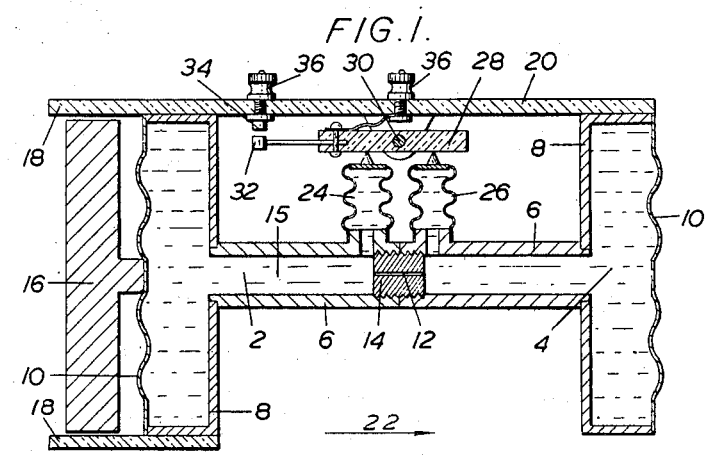
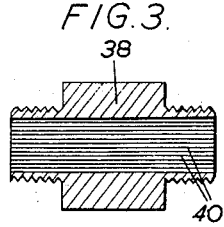
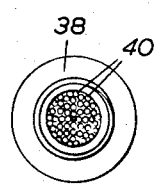
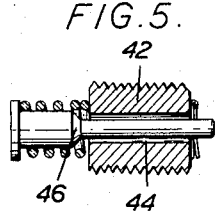
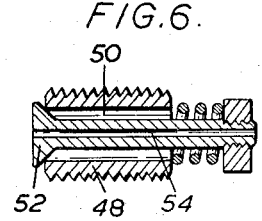

Jan. 8, 1957  R. W. J. COCKRAM  2,776,829
DEVICES RESPONSIVE TO RATES OF CHANGE OF ACCELERATION
Filed March 19, 1953  3 Sheets-Sheet 2
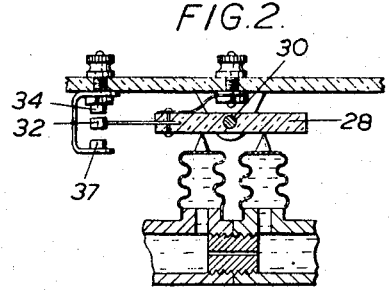
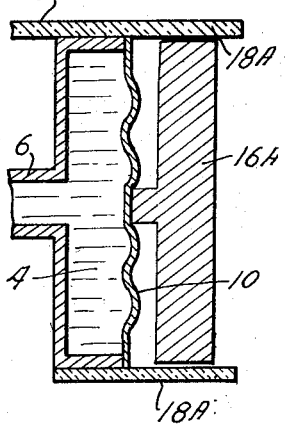
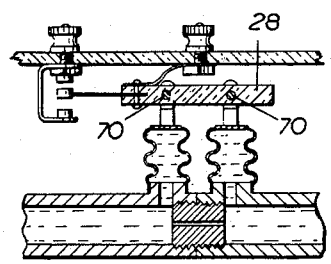
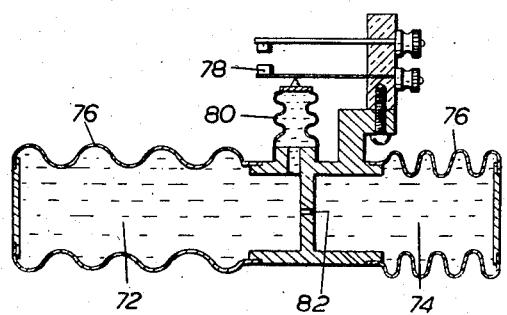

United States Patent Office 2,776,829
Patented Jan. 8, 1957

2,776,829

DEVICES RESPONSIVE TO RATES OF CHANGE OF ACCELERATION

Reginald William James Cockram, Chiswick, London, England, assignor to The Pyrene Company, Limited, Brentford, England Application March 19, 1953, Serial No. 343,320

Claims priority, application Great Britain March 19, 1952

11 Claims. (Cl. 264—1)

In aircraft, devices known as crash switches are commonly employed to control the automatic electrical release of fire extinguishers. The requirements are that if ever the aircraft crashes the extinguishers should be released, and that in flight, even in violent maneuvers, the extinguishers should never be released. Crash switches usually include a mass which can move within the switch under restraint. When the aircraft is at rest or in steady flight, and thus subject to no acceleration, the mass assumes a definite position of rest relative to the housing of the switch. In a crash the mass tends to continue in motion and thus becomes displaced relatively to the housing. This displacement is used to change over the switch and so release fire extinguishers.

Now also when the aircraft, and hence the housing of the switch, is subjected to a constant sustained acceleration, there is a tendency for the mass to take up a displaced position relative to the housing. It is necessary for the restraint on the mass to be such that the switch does not change over when the aircraft is subjected to acceleration in normal flight. For example, crash switches may be required not to change over if subjected to constant sustained accelerations of any value between 0 and 6 g. It is difficult to make a switch which will satisfy this requirement and yet be certain to change over in a crash, the reason being that, owing to yielding of the aircraft structure and oblique impact with the ground, the acceleration to which a switch is subjected in a crash may be hardly larger than the maximum acceleration experienced in normal flight.

The primary object of the present invention is to overcome this difficulty and provide a device which will give a response (for example will close a switch) when subjected to a crash, but will give no such response when subjected to sustained constant accelerations within a specified range.

The invention will be described with reference to certain devices embodying the invention which are shown by way of example in the accompanying drawings.

Figure 1 is a longitudinal section through a device made in accordance with the invention.

Figure 1A is a detail view in vertical section showing a modification of the right hand part of Figure 1.

Figure 2 is a detail view of a portion of the device showing a modified switch arrangement.

Figures 3, 4, 5 and 6 are cross sectional views through modified forms of plugs which may be employed.

Figure 9 is a detail view showing a different switch linkage embodied in the invention, and Figure 10 is a sectional view through a still further modification of the invention.

Figure 7:
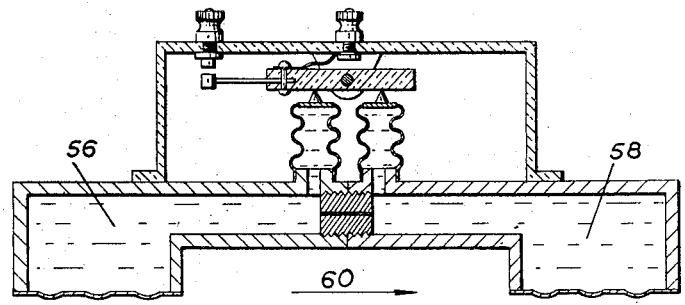
Figure 7 is a schematic view of a modified form of device.

Referring now to Figure 1, the device illustrated comprises two chambers 2 and 4 each bounded partly by rigid walls in the form of a tube 6 and cup 8 and partly by a yielding wall in the form of a resilient diaphragm 10. The chambers intercommunicate through a restricted connection formed by a bore 12 in a plug 14 screwed into the tubes 6. The chambers and connection thus form a closed system which is full of liquid 15. A weight 16 is attached, for example by screwing or welding, to the centre of one of the diaphragms 10, and can slide in guides 18 integral with a mounting 20 for the cups 8. The mounting 20 is adapted to be secured in any suitable way to a part of the plane structure.

The liquid 15 can move to and fro through the connection 12, and such movement is accompanied by corresponding movement of the diaphragms 10 and the weight 16. That is to say, the movable components have one degree of freedom.

When the device is at rest or moving at a constant steady velocity, i. e. is subjected to zero acceleration, the movable components take up a definite position stationary with respect to the mounting 20. The pressure is uniform throughout the liquid.

When the device is subjected to a constant steady acceleration in the direction of the arrow 22, the movable components take up a new stationary position in which the diaphragms 10 are sufficiently distorted to apply the requisite accelerating force to the liquid 15 and the weight 16. There is a uniform falling pressure gradient through the liquid in the direction 22.

When the device is subjected to changing acceleration, then the movable components tend to move correspondingly with respect to the mounting 20 and as a result liquid flows through the connection 12. For example, if the acceleration in the direction 22 decreases, liquid tends to flow in that direction, i. e. from the chamber 2 to the chamber 4. The flow of liquid is accompanied by establishment of a pressure difference across the connection 12. This pressure difference is a function of the rate of flow. The restriction of the connection also causes some lag in the movement of the components, and in addition damps out any tendency to oscillation of the movable components.

Although mathematical analysis of the operation of the device is involved, it can be said that the pressure difference across the connection 12 is determined by the changes in acceleration to which the device is being subjected. Now although the maximum acceleration experienced in a crash may be hardly larger than the maximum acceleration liable to be experienced in flight, acceleration undergoes changes in a crash far more rapidly than in flight. The reason is that it is possible for an aircraft in flight to be subjected to high positive or negative accelerations in certain directions by moving in a path of small radius; i. e. by making a tight turn or a tight pull out from a dive, the maximum acceleration being determined principally by the strength of the aircraft, but on the other hand the rate at which that acceleration can be increased or diminished, i. e. the rate at which the radius of the path can be changed, is limited by the rate at which the control surfaces can be moved, and by the moment of inertia of the aircraft. Devices embodying the present invention distinguish crash conditions from normal flight by distinguishing rapid changes in acceleration from an absence of rapid changes of acceleration.

In the device shown in Figure 1, two small resilient bellows 24 and 26 are connected to the chambers 2 and 4, close to the ends of the restricted connection 12. The movable outer ends of the bellows bear on a lever 28 which is centrally pivoted on a pin 30 carried by the mounting 20. The lever carries a contact 32, and when the pressure difference across the connection 12 exceeds a predetermined value, the contact 32 reaches a second contact 34 carried by the mounting 20, and thus completes any circuit connected to terminals 36.

Under conditions of no acceleration the pressure in both bellows is the same, and there is a gap between the contacts, as shown in Figure 1. Under conditions of constant sustained acceleration there will be a small difference in pressure in the bellows, owing to the pressure gradient throughout the apparatus, but the effect of this is small, and in normal flight scarcely alters the gap. Under a change in acceleration there will be a difference in pressure in the bellows, and the gap between the contacts will change, but in normal flight will not close. In a crash, on the other hand, if the device is moving in the direction 22 and is abruptly brought to rest, there will be a sudden build up of pressure in the chamber 2 adjacent the connection 12, and a decrease in pressure in chamber 4 adjacent the connection 12, due to the forces applied to the liquid and the weight 16 to cause the rapid deceleration. The flow of liquid through the connection 12 will not be rapid enough to effect a substantial balance of pressure at the two ends of the plug 14 so that the pressure in the bellows 24 will for a brief time considerably exceed that in the bellows 26, and hence the contacts 32 and 34 will close. The pressure differential and the flow of liquid through the connection 12 will die away, with or without oscillation, according to the degree of damping imposed by the restricted connection. Accordingly the contacts will open again, but the circuit closed by them can if required be maintained by connecting them in circuit with a self-holding relay.

The device shown in Figure 1 is responsive to the resolved component of acceleration in the direction 22. Moreover it is responsive only to crash conditions following movement in the forward direction 22. It should therefore be mounted in an aircraft with the chamber 4 to the front. If desired, as shown in Figure 2, a second fixed contact 37, in parallel with the contact 34, may be fixed below the contact 32. The device may then be mounted facing either way. It may be desirable to provide an aircraft with several devices facing in different directions, or to fit devices in different parts of the aircraft, since the nearer a device is to the part which strikes the ground, the more certain it is to respond, and in a crash it is not always the same part which strikes the ground.

A number of modifications may be made to the restricted connection between the chambers 2 and 4.

Figure 3 is a section and Figure 4 an end elevation, both on a larger scale, of an alternative to the plug 14. This plug 38 has a larger central bore filled with a plurality of fine tubes 40 in parallel relation. This is less liable to be put out of action by grit, since if one or a few of the tubes or passages between them should become blocked by grit, the effect on the operation of the device is small.

Figure 5 is a section of a plug 42 with a bore 44 controlled by a spring-loaded valve 46. This valve closes when the pressure difference across the bore exceeds a predetermined value, and so aggravates the effect on the bellows 24 and 26 of a change of acceleration of the device.

Figure 6 is a section of a plug 48 with a large bore 50 normally closed by a spring-loaded valve 52. Normally a restricted connection is formed by a small bore 54 in the stem of the valve 52, but after forces have caused a flow of liquid to the right, as seen in the figure, and have declined again, the valve opens to permit free return of the liquid to the left.

The restricted connection may also be in the form of an annular clearance between the wall of a bore, and the wall of a rod lying in the bore. If the rod is of a material having a higher co-efficient of thermal expansion than the wall of the bore, the clearance will contract as the temperature rises, and so compenaste for decrease of viscosity of the liquid. This may be unnecessary if, as is preferred, the liquid used is a silicone, the viscosity of which is only slightly effected by temperature.

The essential components of the device shown in Figure 1 are two chambers each in part defined by a resilient yielding wall, a restricted connection between the chambers, liquid filling the closed system formed by the chambers and connection, a weight connected to one yielding wall, and means responsive to pressure differences across the connection.

These components can be modified and their arrangement altered to a considerable extent. Consider first the rearrangement of the components, for example the placing of the diaphragms as side instead of end walls of the chambers, so that upon a flow of liquid through the restricted connection the movable components, i. e. the liquid, yielding walls, and weight, move in directions inclined to or parallel to one another, but not in direct alinement.

It is essential for operation according to the invention that flow of liquid through the connection is accompanied by a net shift of mass of the movable components relative to the mounting. By "shift of mass" is meant a vector quantity having the value of mass multiplied by distance. The greater the shift of mass for a given volumetric displacement of liquid through the restriction, the more sensitive the device other things being equal. The shift of mass in response to a given acceleration is proportional to the resolved component of the acceleration in the direction of the shift of mass.

The next shift of mass may be due principally to shift of mass of the liquid, or principally to shift of mass of the remaining movable components. The net shift of mass of the liquid is the product of several quantities, one of which is the distance from one yielding wall to the other. The net shift of mass of the remaining components is greatest if they all move in the same direction when liquid flows through the restricted connection. The two effects combine to the greatest extent if the direction of movement of the remaining components is parallel to a line joining the centres of the yielding walls. The arrangement of the device shown in Figure 1 takes account of these considerations.

It is however possible to rely on one effect only. Figure 7 is a diagram of a device the operation of which depends solely on a net shift of mass of the liquid. The chambers 56 and 58 of the device are bounded on one face, such as the bottom, by resilient diaphragms which distort in a direction at right angles to the direction 60 of acceleration to which the device is responsive.

Figure 8:
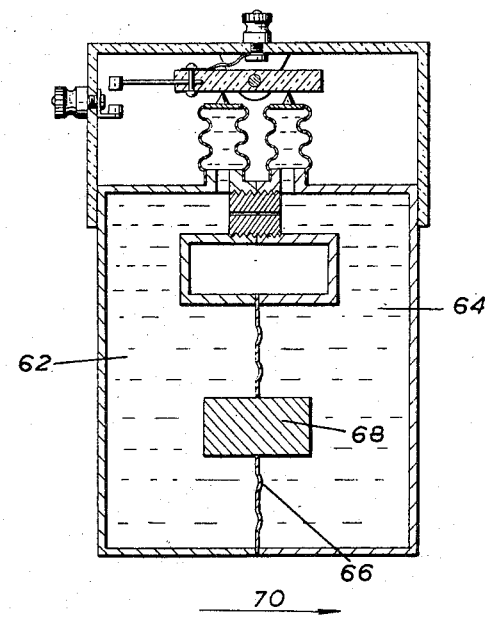
Figure 8 is a schematic view of another modified form of the device.

Figure 8 is a diagram of a device the operation of which depends solely on a net shift of mass of the remaining movable components. The chambers 62 and 64 are bounded by a common resilient flexible diaphragm 66 loaded centrally with a weight 68. The device is responsive to acceleration in the direction 70.

In the device shown in Figure 1 a weight 16 is connected to one of the diaphragms to assist operation. The effect of the weight is combined with the effect of the mass of the diaphragm itself. It is possible to dispense with a weight, or to connect a weight to each diaphragm. Figure 1A shows the right hand side of Figure 1 modified by the provision of a second weight 16A and guides 18A.

Moreover, in the device shown in Figure 1 both diaphragms are resilient. It is however only essential for one to be resilient; the other may be flexible but non-resilient.

The diaphragms may be replaced by other forms of yielding wall, for example pistons, or the chambers may be in the form of bellows.

Likewise, in place of the small bellows 24 and 26 other pressure-responsive means may be employed such as flexible diaphragms, pistons or Bourdon tubes.

If the two chambers with associated yielding walls, and weights if any, are identical (which is not the case in Figure 1 owing to the presence of the weight 16) then the mean of the pressures at each end of the restricted connection will remain constant independent of all fluctuations in those pressures. Hence if the lever 28 is permitted to float as shown in Figure 9, with no central pivot but with pivotal connections 70 to the small bellows, the apparatus will behave in the same way as if the central pivot were present. This ceases to be true if the distortion of the chambers under high acceleration introduces substantial asymmetry.

If, however, the two chambers with associated parts are not identical, then when the device is subjected to a constant sustained acceleration the mean of the pressures in the two small bellows will be different from the mean when the device is subjected to no acceleration. Thus the relative position of the contacts is in part dependent on the magnitude of the acceleration. This is permissible provided the design is such that the contacts do not close when the device is subjected to constant sustained acceleration within the range in which it is specified that the device is to give no response.

Since in an apparatus with identical chambers the mean of the pressures in the small bellows is the same, it is also possible to dispense with one small bellows in the manner shown in Figure 10. In this device the chambers 72 and 74 are bounded by bellows 76, and a movable contact 78 is controlled by a small bellows 80 communicating with the system close to one end of the connection 82, which is in the form of an orifice in a plate.

The bellows 76 are identical but are shown in a distorted position corresponding to subjection to a high acceleration. Account must be taken of the fact that, while under normal conditions the device is symmetrical, under a high acceleration, the distortion of the chambers may render the device so asymmetrical that a substantial pressure change proportional to the acceleration occurs in the bellows 80.

In Figure 1 the two small bellows are connected to the system close to the ends of the restricted connection. It is possible to connect the small bellows at points more remote from the restricted connection, but this will increase the difference in pressure in the bellows which will arise under constant acceleration as a result of the pressure gradient throughout the system. Care must therefore be taken that the contacts do not close when the device is subjected to constant acceleration within the range in which it is specified that the device is to give no response.

In the devices shown in the drawings, the system is full of liquid. It is, however, also possible to employ gas as a filling for the system. In a gas-filled device the shift of mass will be almost entirely due to the other movable components.

In the drawings, the pressure-sensitive means is shown controlling contacts which are normally open with a gap between them. For certain forms of circuit it may be desirable for the contacts to be normally closed under spring pressure, and to open under crash conditions. Moreover other means, such as toggle action switches, may be employed in place of a self-holding relay to perpetuate the crash signal.

It is also possible for the pressure-sensitive means to control pneumatic or other apparatus rather than an electric circuit. Thus the contacts may be replaced by a pilot valve or by trigger mechanism.

The dimensions of devices according to the invention for any particular use are best determined by experiment, rather than by theoretical calculation. Any calculation, in addition to its inherent complexity, is liable to inaccuracy owing to the fact that at low pressures in the liquid cavitation will occur so that the closed system will cease to have a determinate volume. A device can for test purposes be placed on a table revolving at an appropriate constant speed and will thus be subjected to a constant acceleration towards the centre of the table, and can be subjected to change of acceleration by application of a brake to the table, or by being run on a trolley down an inclined plane and retarded by a magnetic brake.

I claim:

1. A crash-sensitive device comprising two chambers each in part defined by yielding wall means, said yielding wall means for at least one of said chambers being resilient, a weight secured to the yielding wall means of at least one of said chambers, means defining a restricted connection between said chambers, said chambers and connection together forming a closed system, fluid filling said system, and means independent of said yielding wall means responsive to fluctuations of pressure of said fluid at at least one point in said sytem.

2. A crash-sensitive device comprising two chambers each in part defined by a yielding wall, at least one of said yielding walls being resilient, and at least one of said yielding walls having a weight secured thereto, means defining a restricted connection between said chambers, said chambers and connection together forming a closed system, fluid filling said system, and means independent of said yielding walls responsive to fluctuations of pressure of said fluid at at least one point in said system.

3. A crash-sensitive device comprising two chambers each in part defined by a yielding wall, said yielding wall for at least one of said chambers being resilient, an equal weight secured to each of said yielding walls, means defining a restricted connection between said chambers, said chambers and connection together forming a closed system, fluid filling said system, and means independent of said yielding walls responsive to fluctuations of pressure of said fluid at at least one point in said system, the arrangement being such that upon a flow of fluid through said connection said weights move in the same direction along a common line.

4. A crash-sensitive device comprising two identical chambers each in part defined by a resilient wall, means defining a restricted connection between said chambers, said chambers and connection together forming a closed system, fluid filling said system, and means independent of said resilient walls responsive to fluctuations of pressure of said fluid at at least one point in said system.

5. A crash-sensitive device as claimed in claim 4 wherein said means independent of said resilient walls comprises a pressure responsive member communicating with said system close to one end of said restricted connection.

6. A crash-sensitive device comprising two chambers each in part defined by a yielding wall, at least one of said yielding walls being resilient, means defining a restricted connection between said chambers, said chambers and connection together forming a closed system, fluid filling said system, and means independent of said yielding walls responsive to fluctuations in the pressure differential across said connection.

7. A crash-sensitive device as claimed in claim 6 wherein said means independent of said resilient walls comprises two pressure responsive members communicating with said system at respective points, one close to each end of said restricted connection, and mechanism combining the responses of both members.

8. A crash-sensitive device comprising two chambers each in part defined by a yielding wall, at least one of said yielding walls being resilient, a restricted connection between said chambers formed by a plurality of lengths of fine tube mounted in parallel relation, said chambers and connection together forming a closed system, fluid filling said system, and means independent of said yielding walls responsive to fluctuations of pressure of said fluid at at least one point in said system.

9. A crash-sensitive device comprising two chambers each in part defined by a yielding wall, at least one of said yielding walls being resilient, means defining a restricted connection between said chambers, said chambers and connection together forming a closed system, fluid filling said system, means independent of said yielding walls responsive to fluctuations of pressure of said fluid at at least one point in said system, means defining a relief passage in parallel with said connection, and normally-closed pressure-sensitive valve means controlling said passage and adapted to open said passage on the pressure differential across said connection exceeding a predetermined value in a predetermined sense.

10. A crash-sensitive device comprising two chambers each in part defined by a yielding wall, at least one of said yielding walls being resilient, means defining a restricted connection between said chambers, said chambers and connection together forming a closed system, fluid filling said system, means independent of said yielding walls responsive to fluctuations of pressure of said fluid at at least one point in said system, and valve means associated with said restricted connection for closing the same, said valve means being pressure responsive and adapted to close said connection when the pressure differential across the same exceeds a predetermined value in a predetermined sense.

11. A crash-sensitive device comprising two chambers each in part defined by yielding wall means, said yielding wall means for at least one of said chambers being resilient, a weight secured to the yielding wall means of at least one of said chambers, means defining a restricted connection between said chambers, said chambers and connection together forming a closed system, fluid filling said system, and means independent of said yielding wall means responsive to fluctuations in the pressure differential across said connection.

References Cited in the file of this patent

UNITED STATES PATENTS

| | | |
|---|---|---|
| 1,595,225 | Coffin | Aug. 10, 1926 |
| 2,347,962 | Oliver | May 2, 1944 |